June 20, 1933. A. SCHMIDT 1,915,135
MEAT CUTTING MACHINE
Filed Feb. 29, 1932   4 Sheets-Sheet 3
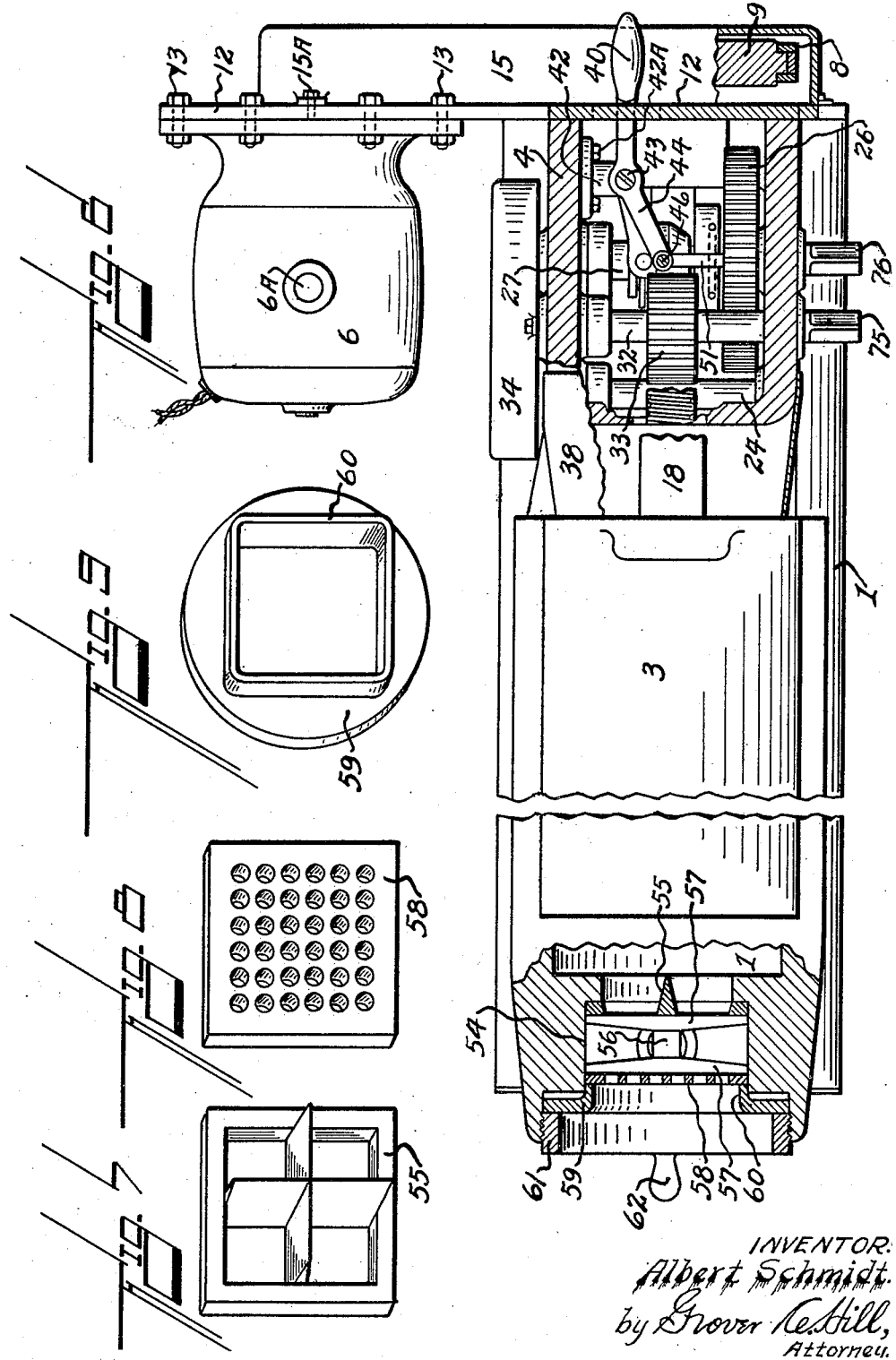
INVENTOR:
Albert Schmidt.
by Grover C. Hill,
Attorney.

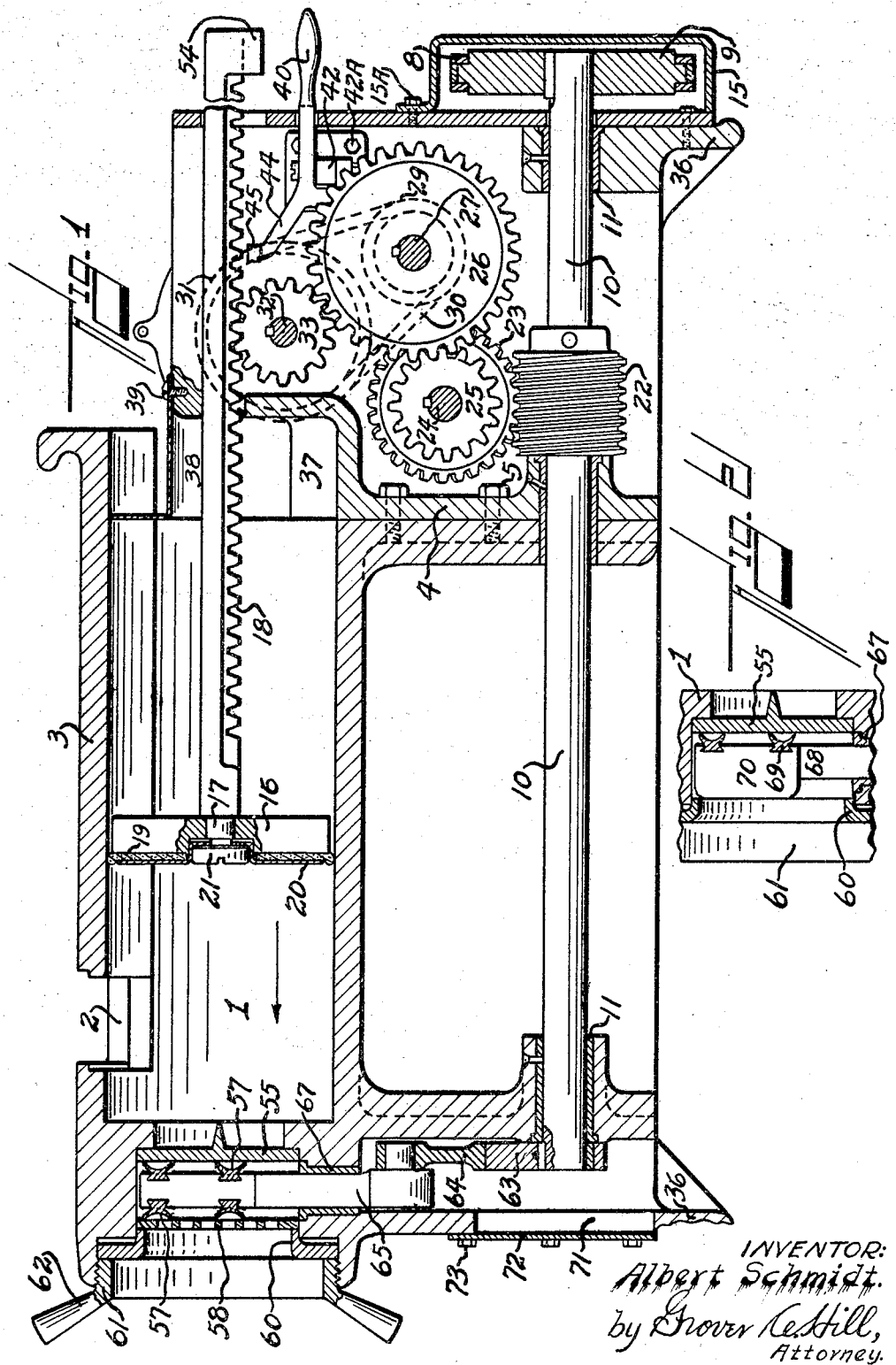

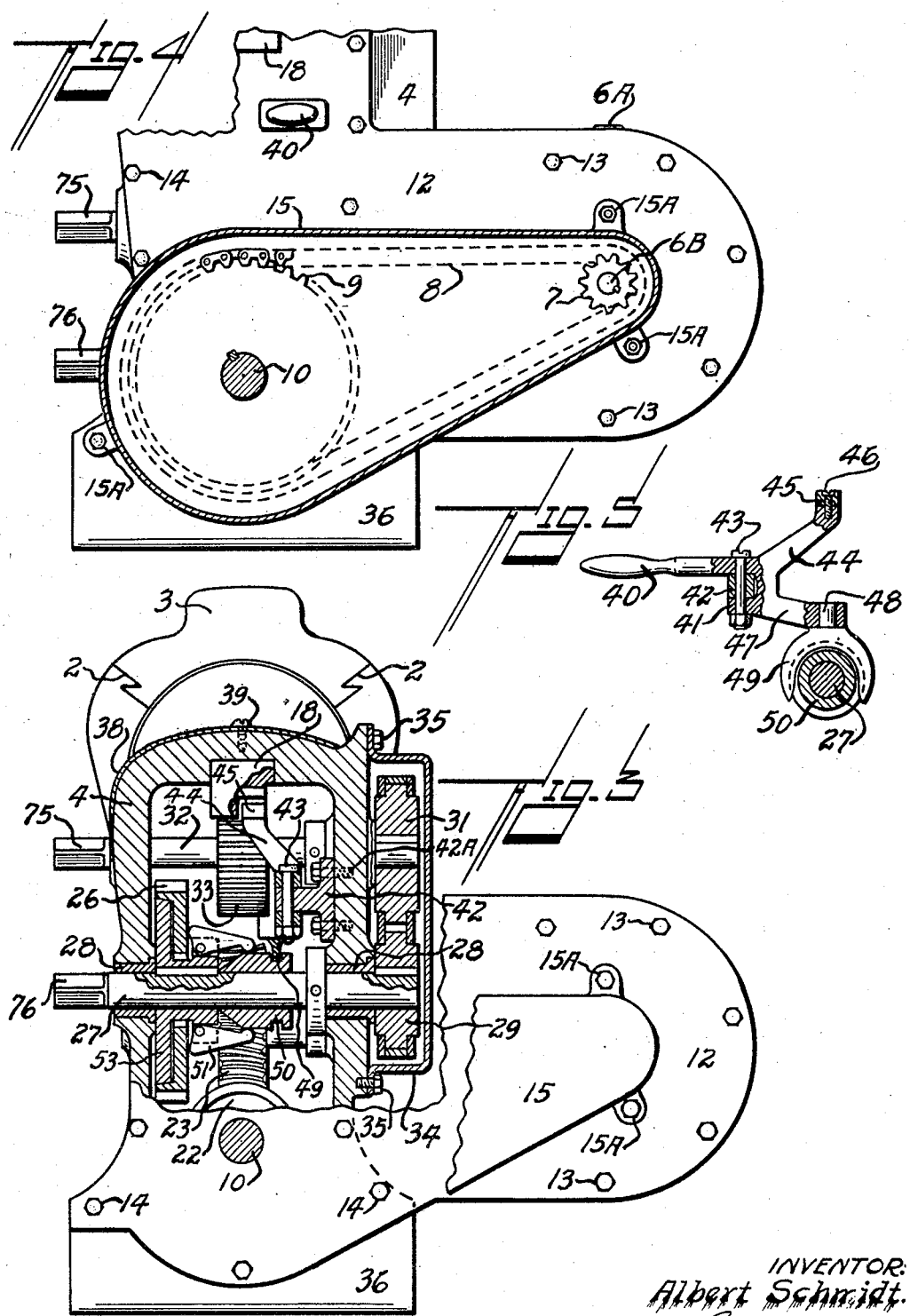

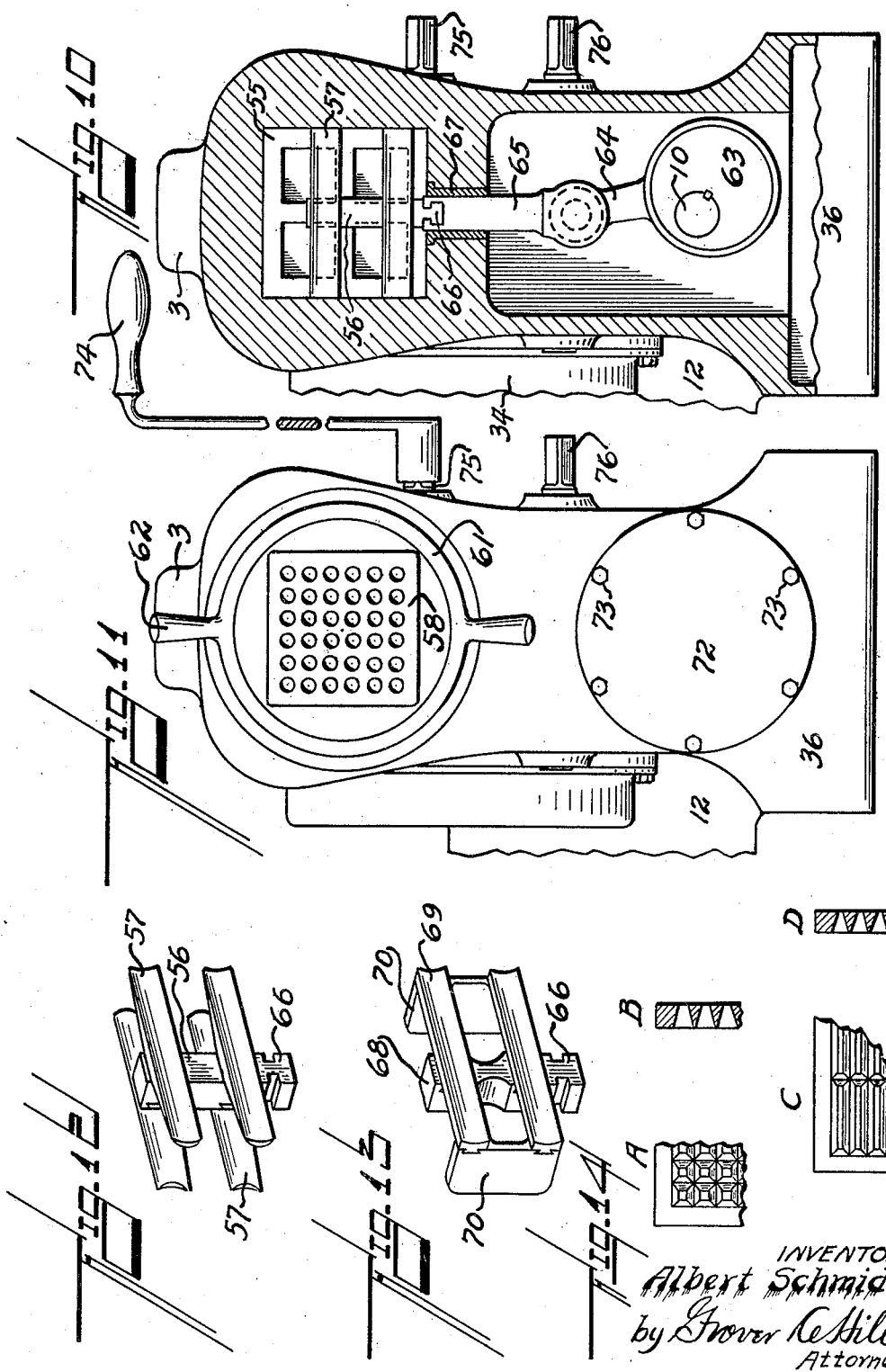

Patented June 20, 1933

1,915,135

UNITED STATES PATENT OFFICE

ALBERT SCHMIDT, OF HAZEL PARK, MICHIGAN, ASSIGNOR OF ONE-THIRD TO OTTO A. WARBELOW AND ONE-THIRD TO GUST HAMEL, BOTH OF DETROIT, MICHIGAN

MEAT CUTTING MACHINE

Application filed February 29, 1932. Serial No. 595,686.

My invention relates to machines for cutting meat for the purpose of making sausage and similar products of meat, and provides a device of this character embodying a horizontally disposed cylinder with vertically operating reciprocating knives at one end of the cylinder, the meat being fed to the knives by a plunger within the cylinder.

The main object of my invention is that this machine will more effectively cut the meat in a rapid and uniform manner, and due to the fact that a plunger in the cylinder substitutes the worm type, friction is greatly reduced, thus almost entirely eliminating heat to the meat as result of the great friction produced in the worm type cutter. Also the rapid process of the reciprocating knives does not crush the meat, but cuts every piece entirely until all meat in the cylinder is consumed.

In the old type of machines the meat is fed to knives that cut in circular motion which wear very rapidly and produce a high degree of friction and the resultant heat therefrom.

Another advantage of my construction of reciprocating knives is the fact that all passages within the stationary plate are utilized during the operation of the machine, which not only effect maximum cutting qualities but reduce friction and unnecessary wear, thereby extending the life of my machine a period far greater than that of all types of the older creations.

The advantages of my knives are so numerous that space herein prevents me from relating all, however during the disclosure of the following detailed description, illustrations throughout the accompanying drawings and particularly within the appended claims, the most important advantages will be clearly revealed.

With reference to the drawings:

Figure 1 is a longitudinal section of the complete machine through the center thereof with motor upon the opposite side obstructed from view.

Figure 2 is a sectional view of the single type of cutter adaptable to cutting New England ham and similar products.

Figure 3 is a rear elevation of the machine with a portion thereof broken and exposing a portion of the interior thereof.

Figure 4 is a partial rear elevation of the machine with motor drive chain and housing therefor exposed as indicated.

Figure 5 is a part section and elevation of the clutch mechanism.

Figure 6 is a top plan view of the entire machine with certain portions thereof broken away, exposing to view certain interior arrangement of parts.

Figures 7, 8 and 9 are perspective views. Figure 7 is of the stationary slicing member; Figure 8 is of the stationary cutting plate, and Figure 9 shows the collar for retaining the said plate in position.

Figure 10 is a sectional front elevation of the machine, and broken as indicated.

Figure 11 is a front elevation of the machine with a portion thereof broken as shown.

Figure 12 is a perspective view of the double cutting reciprocating knives; and Figure 13 is a similar view, but of the single cutting reciprocating knife.

Figure 14 is a fragmentary view of several modified forms of construction of the stationary cutting plate, namely:

A to D views inclusive are partial views; A view shows a front elevation of the type of plate for cutting fat, and likewise B view shows a sectional view thereof; C view shows a front elevation of the type of plate for cutting head cheese and similar products, and D view indicates a section thereof.

In carrying out my invention I employ a casting which forms horizontal cylinder 1, and the same having an elongated opening in the top thereof with grooves 2 adapted to receive slidable cover 3, and the said cover having similar grooves to that of grooves 2. With reference to Figure 1 it is seen that additional casting 4 is provided and secured to the said cylinder casting by cap screws 5.

The machine is powered by means of electric motor 6 with main control switch 6A therefor. Sprocket 7 is secured to motor shaft 6B and engages similarly disposed chain 8, which in turn engages larger sprocket 9, and the latter sprocket connected to principal driven shaft 10, the said shaft journaled in bearings 11 in members 1 and 4 respectively. Motor 6 is supported from the machine by plate 12, which is formed as indicated in Figures 3 and 4. Bolts 13 are employed to secure the motor to the said plate, and cap screws 14 are likewise used to secure the said plate to member 4. Sprockets 7 and 9 and chain 8 are effectively enclosed by housing 15, and the said housing secured to plate 12 by cap screws 15A, as shown.

Plunger 16 is provided which is adapted to actuate within cylinder 1. The said plunger is secured to shoulder 17 of rack 18, (see Figure 1). In this view it is seen that the said plunger is somewhat less in diameter than cylinder 1, and the pressure of the plunger depending upon leather disc 19 which is secured to the plunger by metal disc 20 with nut 21 upon shank 17 in recessed portion as indicated. Plunger 16 is actuated through rack 18 as follows:

Worm 22 is connected to shaft 10, and the said worm engages gear 23, the said gear is secured to lateral shaft 24. Gear 25 being connected to shaft 24, engages larger gear 26, and the latter gear secured to lateral shaft 27, and the said shaft journaled in bearing 28 as indicated in Figure 3. Upon the opposite end of shaft 27 is secured sprocket 29 and by means of chain 30 this sprocket drives larger sprocket 31, and the latter sprocket connected to lateral shaft 32. Gear 33 being secured to shaft 32, engages rack 18, as clearly seen in Figures 1 and 3. In Figure 3 it is observed that housing 34 is provided for the last-named sprocket mechanism and is secured to member 4 by cap screws 35.

Again referring to the framework of the machine and referring to Figures 1, 3 and 4, it is clearly observed that front and rear portions 36 depending from and forming part of members 1 and 4 respectively, elevate the machine somewhat and form a suitable support for the same.

Portion 37 in Figure 1 is provided with detachable cover 38, which is retained where shown upon member 4 by screw 39. The object of the said cover is to keep this portion clean from dust and the like as certain particles of meat may accumulate in portion 37 and by easily removing cover 38 this portion may be readily cleaned and kept in a sanitary condition.

An important part of my device is the clutch mechanism that I employ, which is presently explained.

With particular reference to Figures 3, 5 and 6, handle member 40 is provided, and has yoke portion 41 which is adapted to engage member 42 and pivot in relation thereto by means of bolt 43 with the usual nut therefor. Member 42 is secured to casting member 4 by cap screws 42A as shown. Arm 44 is formed upon member 40 and hardened lug 45 is secured to the same by screw 46. An additional arm 47 is formed upon member 40, and is provided with an opening within the end thereof to receive shank 48 of yoke 49, and the said shank to permit free oscillation thereupon of arm 47. Said yoke to engage grooved spool 50, and one end of the said spool being beveled and adapted to engage pivotal fingers 51, which are upon hub 52 of disc 53, and the said disc within gear 26. At the expiration of the full travel of plunger 16 within cylinder 1 in the direction of the arrow in Figure 1, cam portion 54 formed upon the rear end of rack 18 will strike hardened lug 45 upon member 40 and thereby shift spool 50 upon shaft 27, simultaneously releasing fingers 51 and gear 26 from disc 53, the said disc being keyed to shaft 27. Before starting the machine lever portion of member 40 is moved slightly in a transverse manner, thereby engaging the clutch and shaft 27 with gear 26, the drive now being direct, motor 6 is started by switch 6A, and the machine is in operation inasmuch as the meat being placed within cylinder 1 and the mechanism entirely up to the reciprocating knives.

While all of the various elements of the mechanism as previously described are important to the operation of the machine, the outstanding feature thereof is the reciprocating knife unit, which presently follows.

Referring more particularly to Figures 1 and 6, opening 54 is provided in the front end of cylinder member 1, which is adapted to receive meat slicing member 55, and with reference to Figure 12 it is seen that double reciprocating knife member 56 is provided, and to which is secured oppositely disposed knives 57 with concaved inner surfaces as shown. Stationary cutting plate 58 is provided where shown and retained in the position as indicated in Figure 6 by pressure disc 59 with extended portion 60 thereupon, and all of the knife elements just named held in place by externally threaded ring 61, which is adapted to engage a similarly threaded opening in member 1, also handle knobs 62 formed upon the said ring as indicated.

With reference to Figures 1 and 10, it is seen that cam 63 is secured to the front end of shaft 10, and the said cam having upwardly extending arm 64 formed thereon, and the end of the said arm having pivotal connection with vertically actuating link 65, the upper end of the said link to interlock portion 66 of member 56, therefore it is now understood that knives 57 of member 56, will oscillate adjacent cutting members 55 and 58, the latter members being stationary with member 1, as shaft 10 is rotated during the operation of the machine. Bearing 67 in member 4 for the said link.

For cutting New England ham and similar products I have devised a single cutting knife as clearly shown in Figure 13. This is composed of member 68 having secured thereto knives 69. In the use of this type of cutter as clearly shown in Figure 2, and in Figure 13 the portions 70 will oscillate against extended portion 60 of ring 61 and knives 69 are adapted to contact member 55, thereby effecting the slicing of cubes of meat in this manner for the intended purpose.

Referring to Figure 14 the letters A and B illustrate a modified form of plate 58. In the place of the small holes in the said plate, as in Figure 8, the passages are formed as indicated in these views, and this type of plate is for cutting fat. Also under group 14, C and D views show a modified form of plate 58 applicable to the cutting of head cheese and similar products.

In Figures 1 and 11 it is seen that opening 71 is provided in the front portion of cylinder member 1, and which is enclosed by plate 72, and the said plate secured to the said member by cap screws 73 as shown. The purpose of the said opening is to permit access to the cam mechanism shown in Figure 10.

Having fully set forth the details of construction of my invention throughout the preceding paragraphs, the operation of the invention presently follows.

With special reference to Figure 1, the machine being ready to start, cover 3 is slidably moved rearwardly, which exposes cylinder 1 and we find that in order to fill the cylinder with meat, plunger 16 must be returned to maximum rear or normal position, and this is accomplished by the use of crank 74 which is detachably engaged with square shank 75 of lateral shaft 32, see Figure 11. Handle 74 is then removed and cylinder 1 is filled with the proper cuttings of meat, cover 3 is then closed and the machine is put into operation by switch 6A which starts motor 6. The sprocket ratio of the motor drive is such that will convey plunger 16 through intermediate elements as explained in the details of construction, uniformly consistent with the proper feed for the reciprocating knife unit and discharging end of the cylinder. The said knives will operate in their vertical movement at a very rapid rate, or at a predetermined rate that will produce the desired effect according to the feed thereto as aforesaid. When the meat within cylinder 1 is exhausted and plunger 16 will have traveled the maximum forward distance, simultaneously with this position, lug 45 upon arm 44 of member 40 will contact cam portion 54 of rack 18 thereby automatically shifting spool 50 upon shaft 27 releasing fingers 51 and likewise gear 26 through disc 53. At this operation motor 6 will idle until stopped by switch 6A, however there may be a very simple arrangement provided whereby member 40 may at the same time it actuates the said clutch, operate a switch to stop the said motor, but no elements of such a switch is illustrated in the drawings.

If preferred the said motor may be disregarded, and the machine may be successfully operated by hand, and for this purpose square socket 76 is provided upon shaft 27 with the use of crank 74 for this purpose.

A vital advantage of my invention, and one not to be overlooked, is the fact that the reciprocating knife blades 57 or 69 in their vertical motion relative to plate 58 and member 55 all holes in the said plate are covered or passed, which is a decided improvement over the circular cutting knives of the old type machines. The detrimental effect of the old type machines having heretofore been explained I desire to emphasize the importance of this fact by again referring to the same.

Having thus described my invention, what I claim as new is:

1. In combination with a meat cutting machine, a horizontal cylinder for the same, a horizontally disposed driven shaft beneath the said cylinder, a reciprocating knife unit for the device, a mechanism for actuating the knives of the said unit, the said mechanism comprising a cam secured to one end of the said shaft, an upwardly extending arm formed upon the said cam, a link with the lower end thereof pivotally secured to the said arm, a vertically disposed member having secured thereto and near the upper end thereof a plurality of opposed blades, a meat slicing member positioned upon the side adjacent the aforesaid cylinder end and a cutting plate disposed nearest the outer front end of the machine, the inner surface of the said knives being concaved and their cutting edges adapted to contact the said slicing member and plate during the normal rotating of the aforesaid shaft in the operation of the device.

2. In combination with a meat cutting machine, having a horizontal cylinder, a plunger adapted to actuate in the said cylinder, a reciprocating knife unit for the device comprising, an opening in the front end of the said cylinder, a meat slicing member within the said opening and at the inner extremity thereof, a meat discharging plate with a plurality of passages therein disposed near the outer front end of the machine, reciprocating knives intermediate the said slicing member and discharging plate, a disc with a square projecting extended portion thereon, and this portion adapted to press against the said discharging plate, externally threaded ring with handles thereon to engage a similarly threaded opening within the front end of the machine and the same adapted to retain all of the elements named in their normal operating position.

3. In a device of the character described, a vertically disposed member having secured thereto and near the top thereof, a plurality of opposed knives, a meat discharging plate adjacent the outer side of the said member and a meat slicing member adjacent the inner side of the said member, the said knives having their inner surface concaved and the cutting edges thereof adapted to contact respectively the aforesaid slicing and discharging members in the normal reciprocating motion of the said knives relatively to the said connecting members.

In testimony whereof I hereunto affix my signature.

ALBERT SCHMIDT.